United States Patent [19]
Rikima

[11] Patent Number: 5,918,088
[45] Date of Patent: Jun. 29, 1999

[54] IMAGE FORMING APPARATUS AND METHOD OF FORMING IMAGES

[75] Inventor: Yuji Rikima, Tokyo, Japan

[73] Assignee: Kabushiki Kaisha Toshiba, Kawasaki, Japan

[21] Appl. No.: 09/004,774

[22] Filed: Jan. 9, 1998

[30] Foreign Application Priority Data

Jan. 20, 1997 [JP] Japan .................................. 9-007879

[51] Int. Cl.[6] ................................................ G03G 15/00
[52] U.S. Cl. .......................... 399/82; 395/115; 395/116
[58] Field of Search .................................... 399/8, 10, 81, 399/82, 83, 84, 85; 395/101, 114, 115, 116, 117, 144, 145, 146, 147, 148

[56] References Cited

U.S. PATENT DOCUMENTS

| | | | |
|---|---|---|---|
| 5,243,381 | 9/1993 | Hube | 399/84 |
| 5,493,635 | 2/1996 | Brindle et al. | 395/114 |
| 5,732,403 | 3/1998 | Nakamura | 399/81 X |
| 5,740,335 | 4/1998 | Takayanagi et al. | 395/114 X |

FOREIGN PATENT DOCUMENTS 6-91982  4/1994  Japan .

*Primary Examiner*—Arthur T. Grimley
*Assistant Examiner*—Hoan Tran
*Attorney, Agent, or Firm*—Foley & Lardner

[57] ABSTRACT

A system CPU receives print data through an external interface from a host computer or the like connected to a local area network (LAN). The CPU opens a job file in a hard disk drive and generates a job header and a page header in the job file and writes the print data in the job header and the page header. When the sheet size represented by a data item included in the print data changes, the CPU closes the job file and opens a new job file and generates a job header and a page header in the new job file and writes the renewed print data in the job header and page header of the new job file.

14 Claims, 16 Drawing Sheets

| | |
|---|---|
| JOB HEADER | NUMBER OF COPIES |
| | DOUBLE-SIDE PRINT MODE |
| | ORDER OF PRINTING PAGES |
| | SORTING MODE |
| | IMAGE-REDUCING/-COMBINING PRINT MODE |
| | TOTAL NUMBER OF PAGES |
| PAGE HEADER | SHEET SIZE |
| | SHEET SOURCE |
| | TYPE OF IMAGE DATA |
| IMAGE DATA | IMAGE DATA |
| PAGE HEADER | SHEET SIZE |
| | SHEET SOURCE |
| | TYPE OF IMAGE DATA |
| IMAGE DATA | IMAGE DATA |
| | ⋮ |

FIG. 9

| | | |
|---|---|---|
| HOST DATA | NUMBER OF COPIES: | 10 |
| | DOUBLE-SIDE PRINT MODE: | SELECTED |
| | ORDER OF PRINTING PAGES: | REVERSE |
| | SORTING MODE: | SELECTED |
| | IMAGE-REDUCING/-COMBINING PRINT MODE: | 2in1 |
| FIRST PAGE | SHEET SIZE: | A4 |
| | SHEET SOURCE: | UPPER CASSETTE |
| | TYPE OF IMAGE DATA: | COMPRESSED |
| | IMAGE DATA: | DATA OF A4 SIZE |
| SECOND PAGE | SHEET SIZE: | A3 |
| | SHEET SOURCE: | LOWER CASSETTE |
| | TYPE OF IMAGE DATA: | COMPRESSED |
| | IMAGE DATA: | DATA OF A3 SIZE |
| THIRD PAGE | SHEET SIZE: | A3 |
| | SHEET SOURCE: | LOWER CASSETTE |
| | TYPE OF IMAGE DATA: | NOT COMPRESSED |
| | IMAGE DATA: | DATA OF A3 SIZE |
| FOURTH PAGE | SHEET SIZE: | B4 |
| | SHEET SOURCE: | LARGE-CAPACITY FEEDER |
| | TYPE OF IMAGE DATA: | COMPRESSED |
| | IMAGE DATA: | DATA OF B4 SIZE |
| FIFTH PAGE | SHEET SIZE: | B4 |
| | SHEET SOURCE: | LARGE-CAPACITY FEEDER |
| | TYPE OF IMAGE DATA: | COMPRESSED |
| | IMAGE DATA: | DATA OF B4 SIZE |

FIG. 10

| | | |
|---|---|---|
| JOB HEADER | NUMBER OF COPIES: | 10 |
| | DOUBLE-SIDE PRINT MODE: | SELECTED, PORTRAIT |
| | ORDER OF PRINTING PAGES: | REVERSE |
| | SORTING MODE: | SELECTED |
| | TOTAL NUMBER OF PAGES: | 5 |
| PAGE HEADER | SHEET SIZE: | A4 |
| | SHEET SOURCE: | UPPER CASSETTE |
| | TYPE OF IMAGE DATA: | COMPRESSED |
| IMAGE DATA | IMAGE DATA: | DATA OF A4 SIZE |
| PAGE HEADER | SHEET SIZE: | A3 |
| | SHEET SOURCE: | LOWER CASSETTE |
| | TYPE OF IMAGE DATA: | COMPRESSED |
| IMAGE DATA | IMAGE DATA: | DATA OF A3 SIZE |
| PAGE HEADER | SHEET SIZE: | A3 |
| | SHEET SOURCE: | LOWER CASSETTE |
| | TYPE OF IMAGE DATA: | NOT COMPRESSED |
| IMAGE DATA | IMAGE DATA: | DATA OF A3 SIZE |
| PAGE HEADER | SHEET SIZE: | B4 |
| | SHEET SOURCE: | LARGE-CAPACITY FEEDER |
| | TYPE OF IMAGE DATA: | COMPRESSED |
| IMAGE DATA | IMAGE DATA: | DATA OF B4 SIZE |
| PAGE HEADER | SHEET SIZE: | B4 |
| | SHEET SOURCE: | LARGE-CAPACITY FEEDER |
| | TYPE OF IMAGE DATA: | COMPRESSED |
| IMAGE DATA | IMAGE DATA: | DATA OF B4 SIZE |

JOB HEADER

FILE 1

| NUMBER OF COPIES: | 10 |
|---|---|
| SHEET SIZE: | A4 |
| SHEET SOURCE: | UPPER CASSETTE |
| DOUBLE-SIDE PRINT MODE: | NOT SELECTED |
| ORDER OF PRINTING PAGES: | REVERSE |
| SORTING MODE: | SELECTED |
| TOTAL NUMBER OF PAGES: | 1 |
| TYPE OF IMAGE DATA: | COMPRESSED |
| IMAGE DATA: | DATA OF A4 SIZE |

PAGE HEADER / IMAGE DATA

FIG. 12B

FILE 2

| NUMBER OF COPIES: | 10 |
|---|---|
| SHEET SIZE: | A3 |
| SHEET SOURCE: | LOWER CASSETTE |
| DOUBLE-SIDE PRINT MODE: | SELECTED, PORTRAIT |
| ORDER OF PRINTING PAGES: | REVERSE |
| SORTING MODE: | SELECTED |
| TOTAL NUMBER OF PAGES: | 2 |
| TYPE OF IMAGE DATA: | COMPRESSED |
| IMAGE DATA: | DATA OF A3 SIZE |
| TYPE OF IMAGE DATA: | NOT COMPRESSED |
| IMAGE DATA: | DATA OF A3 SIZE |

FIG. 12C

FILE 3

| NUMBER OF COPIES: | 10 |
|---|---|
| SHEET SIZE: | B4 |
| SHEET SOURCE: | LARGE-CAPACITY FEEDER |
| DOUBLE-SIDE PRINT MODE: | SELECTED, PORTRAIT |
| ORDER OF PRINTING PAGES: | REVERSE |
| SORTING MODE: | SELECTED |
| TOTAL NUMBER OF PAGES: | 2 |
| TYPE OF IMAGE DATA: | COMPRESSED |
| IMAGE DATA: | DATA OF B4 SIZE |
| TYPE OF IMAGE DATA: | COMPRESSED |
| IMAGE DATA: | DATA OF B4 SIZE |

IMAGE FORMING APPARATUS AND METHOD OF FORMING IMAGES

BACKGROUND OF THE INVENTION

1. Field of the Invention

The present invention relates to an image forming apparatus, such as a digital copying machine, which has a hard disk drive for storing print jobs in the form of job files and which prints job files, one by one. The present invention also relates to a method of forming images in which job files stored in a hard disk drive are printed one by one.

2. Description of Related Art

A digital copying machine has a hard disk drive for storing print jobs in the form of job files and which prints the job files, one by one. Each print job consists of image data and print data, and is processed in the form of a file called a "job file". The job file consists of job data and page data.

To print each page recorded in a job file, the printing module incorporated in a conventional digital copying machine needs to refer to both the job data and the page data one by one, to determine which printing sequence would be the most appropriate. Assume the job data shows that data should be printed on both sides of a paper sheet, and also shows that the first, second and third pages should be printed on an A4-size sheet, an A3-size sheet and an A3-size sheet, respectively. In this case, the printing module must recognize the sheet size (i.e., A3) for the second page before it prints the first page on an A4-size sheet. Then the printing module must invalidate the double-side print mode, feed an A4-size sheet to the printing position, and print the first page on one side of the A4-size sheet. Further, the printing module must recognize the sheet size (i.e., A3) for the third page before it prints the second page on an A3-size sheet. Since the second and third pages are the same sheet size (i.e., A3 size), the printing modules feeds an A3-size sheet to the printing position and prints the second and third pages respectively on the two sides of the A3-size sheet.

Namely, before printing any page of data, the printing module needs to recognize the size of the paper sheet on which the next page of data should be printed. The operating program of the printing module is inevitably complex. The module requires a comparatively long time to print data on one paper sheet. In addition, it takes much time to develop the operating program of the printing module.

SUMMARY OF THE INVENTION

An object of the present invention is to provide an image forming apparatus having a hard disk drive for storing job files, to design print job files, one by one, in the form of images, and also to provide a method of forming images, in which job files stored in a hard disk drive are printed one by one. In both the apparatus and the method, a module is used to print the file jobs. The operating program of the module is simple and can be developed easily, and the module can print data on one paper sheet within a relatively short time.

A first aspect of the present invention provides an image forming apparatus which comprises receiving means for receiving information transmitted through a communication line and consisting of image-forming data and image data. The image-forming data consists of a plurality of image-forming data items each representing conditions of forming one page of image. The image forming apparatus also comprises memory means for storing a plurality of image-forming data blocks, each consisting of image data items which represent pages of images to be formed under at least one identical condition and an image-forming data item which represents at least one identical condition and other conditions. The image forming apparatus further comprises image-forming means for forming pages of images on recording media in accordance with the image-forming data blocks stored in the memory means, in units of pages which are represented by one image-forming block.

A second aspect of the present invention, provides an image forming apparatus which comprises receiving means for receiving information transmitted through a communication line and consisting of image-forming data and image data. The image-forming data consists of a plurality of image-forming data items each representing conditions of forming one page of image. The image forming apparatus further comprises job file generating means for processing the information transmitted to the receiving means to generate job files each consisting of image data items which represent pages of image to be formed under any identical condition and an image-forming data item which represents the identical condition and other conditions. The image forming apparatus also comprises memory means for storing the job files generated by the job file generating means and image-forming means for forming pages of image on recording media in accordance with the job files stored in the memory means, in units of pages which are represented by one job file.

A third aspect of the present invention provides an image forming apparatus which comprises receiving means for receiving information transmitted through a communication line and consisting of image-forming data and image data. The image-forming data consists of a plurality of image-forming data items each representing a plurality of conditions of forming one page of image. The image forming apparatus also comprises job file generating means for processing the information transmitted to the receiving means to generate job files each consisting of image data items which represent pages of image to be formed under the same conditions and an image-forming data item which represents these conditions, memory means for storing the job files generated by the job file generating means, and image-forming means for forming pages of image on recording media in accordance with the job files stored in the memory means, in units of pages which are represented by one job file.

A fourth aspect of the present invention provides a method of forming images, which comprises the steps of: receiving information transmitted through a communication line and consisting of image-forming data and image data, said image-forming data consisting of a plurality of image-forming data items each representing conditions of forming one page of image; storing a plurality of image-forming data blocks, each consisting of images data items which represent pages of image to be formed under at least one identical condition and an image-forming data item which represents said at least one identical condition and other conditions; and forming pages of image on recording media in accordance with the image-forming data blocks, in units of pages which are represented by one image-forming block.

A fifth aspect of the present invention provides a method of forming images, which comprises the steps of: receiving information transmitted through a communication line and consisting of image-forming data and image data, said image-forming data consisting of a plurality of image-forming data items each representing conditions of forming one page of image; storing a plurality of image-forming data blocks, each consisting of image data items which represent pages of image to be formed under at least one identical condition and an image-forming data item which represents said at least one identical condition and other conditions; and forming pages of image on recording media in accordance with the image-forming data blocks, in units of pages which are represented by one image-forming block.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF SEVERAL VIEWS OF THE DRAWING

FIG. 9 is a diagram illustrating the structure of a conventional job file;

FIG. 10 is a list representing an example of print data;

FIG. 11 is a diagram showing the structure of a conventional job file generated from the print data;

FIG. 12A is a diagram showing the structure of a first type of a job file of the present invention which is generated from the print data;

FIG. 12B is a diagram showing the structure of a second type of a job file of the present invention which is generated from the print data;

FIG. 12C is a diagram showing the structure of a third type of a job file of the present invention which is generated from the print data;

DETAILED DESCRIPTION OF THE INVENTION

An embodiment of the present invention will be described, with reference to the accompanying drawings.

Figure 1:
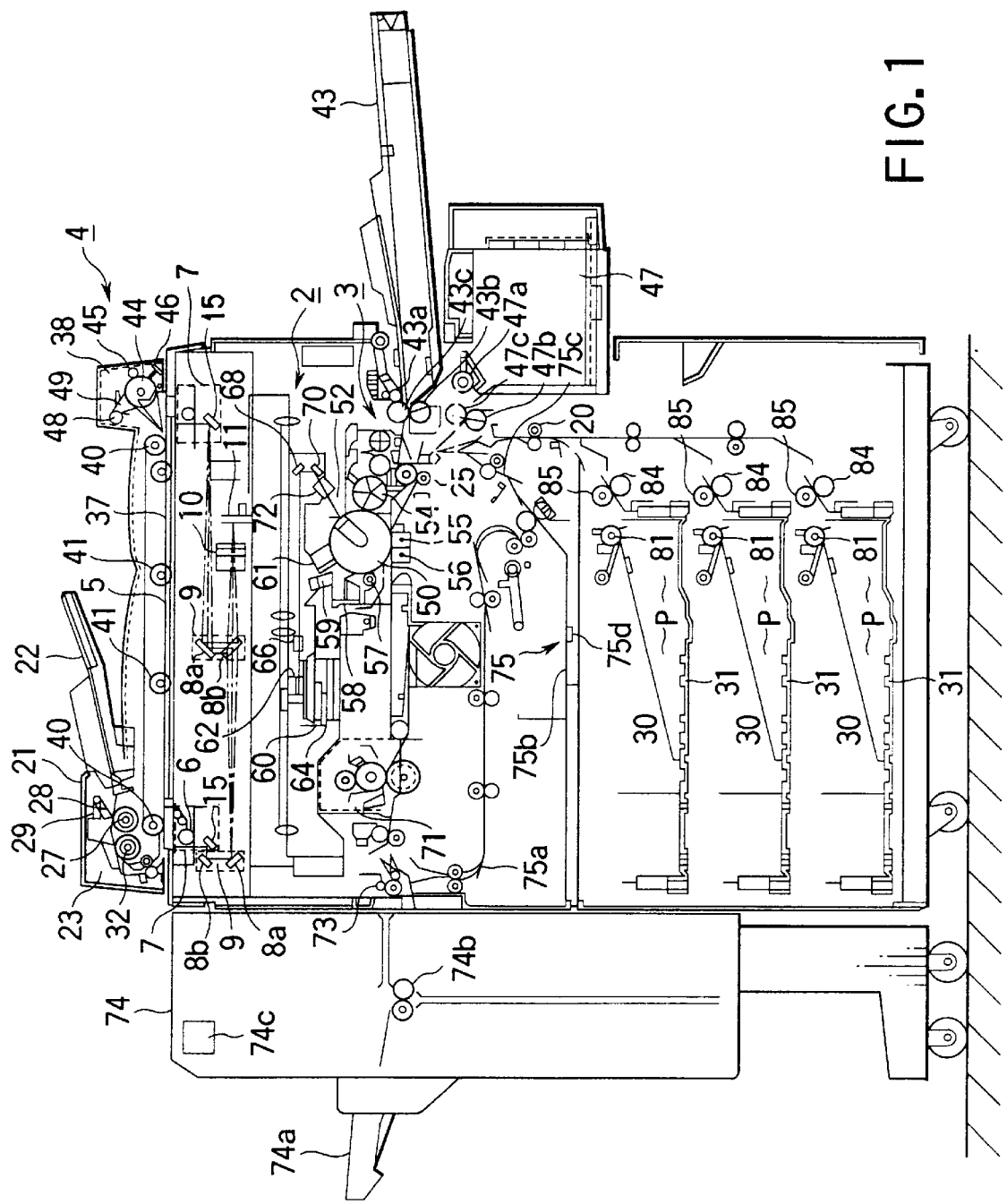
FIG. 1 is a sectional view of an image forming apparatus according to the present invention.

FIG. 1 schematically shows a digital copying machine 1, or an image forming apparatus according to the present invention. As shown in FIG. 1, the digital copying machine 1 comprises a scanner 2, a printer 3 (a laser engine) and an automatic document feeder (ADF) 4.

The digital copying machine 1 further comprises a housing which contains the scanner 2 and the printer 3. The top of the housing is used as a document table 5. The automatic document feeder 4 comprises a document tray 22, a document-feeding section 23, and a document-discharging section 38. The feeder 4 can be rotated between a closed position and an open position to cover and expose the document table 5, respectively.

The scanner 2 functions as a data-reader, and comprises a first carriage 7, a second carriage 9, a lens 10, a CCD sensor 11, and an analog-to-digital (A/D) converter (not shown). The first carriage 7 holds an exposure lamp 6 and a mirror 15. The second carriage 9 holes two mirrors 8a and 8b for bending a light beam path. The lens 10 receives a light beam from the mirror 8b and focuses it on the CCD sensor 11. The CCD sensor 11 generates analog image data from the light beam. The A/D converter converts the analog image data into digital image data.

The first carriage 7 and the second carriage 9 are connected by a timing belt (not shown). The second carriage 9 is moved in the same direction as the first carriage 7 at half the speed thereof. The length of the optical path extending from the mirror 15 to the lens 10, therefore, remains unchanged while the scanner 2 is scanning a document sheet placed on the document table 5. The lens 10 has a fixed focal distance and is moved along its optical axis to enlarge or reduce the image recorded to the document sheet. The CCD sensor 11 comprises a plurality of photoelectric elements (not shown) arranged in rows and columns, each of which generates one analog pixel data item. The analog pixel data items generated by the CCD sensor 11 are supplied to the A/D converter.

The first carriage 7 and the second carriage 9 are driven by two stepping motors (not shown), respectively. More specifically, each carriage is connected to a timing belt (not shown) wrapped around an idle pulley (not shown) and a drive pulley (not shown) which is mounted on a shaft of one of the stepping motors. The lens 10 is connected to a spiral shaft (not shown) and moved along its optical axis as the stepping motor rotates the spiral shaft, moving the same along the optical axis of the spiral shaft.

The printer 3 is the image-forming section of the digital copying machine 1. The printer 3 comprises, for example, a laser system and an electrophotography system. More precisely, the printer 3 comprises a photosensitive drum 50, an exposure device 52, a development unit 54, a transfer charger 55, a sheet-separating charger 56, a pre-cleaning destaticizer 57, a cleaner 58, a destaticizing lamp 59 and a staticizing charger 61. The photosensitive drum 50 is located substantially in the middle part of the housing of the digital copying machine 1. The components 52, 54, 55 to 59 and 61 are located around the photosensitive drum 50 in the order they are mentioned.

The photosensitive drum 50 is an image carrier and is rotatable about its axis. The exposure device 52 comprises a laser diode 60, a collimator lens 62, a polygonal mirror 64, a lens 66, reflectors 68 and 70, and a lens 72. The polygonal mirror 64, the lens 66, and the reflector 68 are located in the optical path of the laser diode 60, in the order they are mentioned. The reflector 70 is disposed below the reflector 68, and the lens 72 is positioned beside the reflector 70. In operation, the diode 60 emits a laser beam, which is applied to the collimator lens 62. The collimator lens 62 focuses the beam and applies it to the polygonal mirror 64. The polygonal mirror 64 rotates, reflecting the laser beam to the lens 66, which focuses the laser beam. The laser beam is applied to the reflector 68. The reflector 68 reflects the laser beam and applies the same to the reflector 70. The reflector 70 also reflects and applies the laser beam to the lens 72, which focuses the beam. The laser beam thus focused is applied from the exposure device 52 to the drum 50, thereby forming an electrostatic latent image of the document sheet on the circumferential surface of the drum 50.

The development unit 54 develops the electrostatic latent image formed on the photosensitive drum 50, and converts the image to a visible image. Meanwhile, a sheet-feeding roller 20 and a sheet-aligning roller 25 feed a paper sheet P (e.g., an image recording medium) to the drum 50 from a paper cassette 30 (described later). The transfer charger 55 transfers the visible image from the photosensitive drum 50 onto one side of the paper sheet P. The sheet-separating charger 56 achieves AC corona discharge, separating the paper sheet P from the photosensitive drum 50. A sheet-conveying belt (not shown) transports the sheet P to a fixing unit 71. The fixing unit 71 melts the toner defining the visible image, thus fixing the image on the paper sheet P. The data recorded on the document sheet is thereby copied on one side of the paper sheet P. A pair of sheet-discharging rollers 73 supplies the copied sheet P to a unit 74. The unit 74 comprises a tray 74a for receiving discharged sheet P, a pair of rollers 74b for placing each discharged sheet P in a face-down position, and a stapler 74c for stapling a set of copied sheets.

Some of the toner applied to the photosensitive drum 50 remains after the paper sheet P with the visible image transferred to its one side is separated from the drum 50. The residual toner is destaticized by the pre-cleaning destaticizer 57 and subsequently cleaned by the cleaner 58. The destaticizing lamp 59 lowers the potential of the drum 50 to a level equal to or less than a predetermined value. The data on the document sheet can thereby be copied on the next paper sheet P. A passage 75a, a tray 75b, a passage 75c and a sheet sensor 75d constitute an automatic double-sided unit 75 which automatically turns over a paper sheet P. To copy data on the other side of the paper sheet P,. the sheet P is supplied from the fixing unit 71 through the passage 75a to the tray 75b. The paper sheet P is further supplied through a passage 75c to the transfer charger 55. The charger 55 transfers a visible image from the photosensitive drum 50 onto the other side of the paper sheet P.

The sheet sensor 75d is located below the tray 75b. The sensor 75d emits a light beam to the tray 75b and can receive the beam reflected from any paper sheet P that exists on the tray 75b. Hence, the sheet sensor 75d can determine whether or not a paper sheet P is stacked on the tray 75b.

Paper cassettes 30 are disposed, one above another, in the housing of the digital copying machine 1. The paper cassettes 30 can be pulled out from the front of the housing. Each paper cassette 30 comprises a case 31. The case 31 has a sheet-feeding section which is inclined upwards in the direction of feeding paper sheets. Each case 31 includes a pickup roller 81 disposed at the exit end of the sheet-feeding section of the case 31. Each pickup roller 81 pulls the uppermost of the paper sheets P stacked in the case 31, from the paper cassette 30.

Sheet-feeding units are disposed outside the paper cassettes 30, respectively, near the sheet-feeding sections of the cases 31. Each sheet-feeding unit comprises a sheet-feeding roller 84 and a sheet-separating roller 85. Alternatively, the sheet-separating roller 85 may be replaced by a separating pad. The sheet-feeding unit feeds the sheet P from the cassette 30 to the printer 3.

A paper cassette 43 and a large-capacity feeder 47 are attached to the right side of the digital copying machine 1. Both the cassette 43 and the feeder 47 can be removed from the housing of the machine 1. A pickup roller 43a and a sheet-feeding unit are disposed at the inner end of the paper cassette 43. The sheet-feeding unit comprises a sheet-feeding roller 43b and a sheet-separating roller 43c. A pickup roller 47a and a sheet-feeding unit are disposed at the inner, upper end of the large-capacity feeder 47. This sheet-feeding unit comprises a sheet-feeding roller 47b and a sheet-separating roller 47c.

The paper cassette 43 holds a stack of paper sheets P. The pickup roller 43a can pull the uppermost of the paper sheets P from the paper cassette 43. The sheet P pulled by the pickup roller 43a is fed toward the printer 3 by the sheet-feeding unit comprising the sheet-feeding roller 43b and sheet-separating roller 43c. The large-capacity feeder 47 also holds a stack of paper sheets P. The pickup roller 47a can pull the uppermost of the paper sheets P from the large-capacity feeder 47. The sheet P pulled by the pickup roller 47a is fed to the printer 3 by a sheet-feeding unit which comprises a sheet-feeding roller 43b and a sheet-separating roller 43c.

Figure 2:
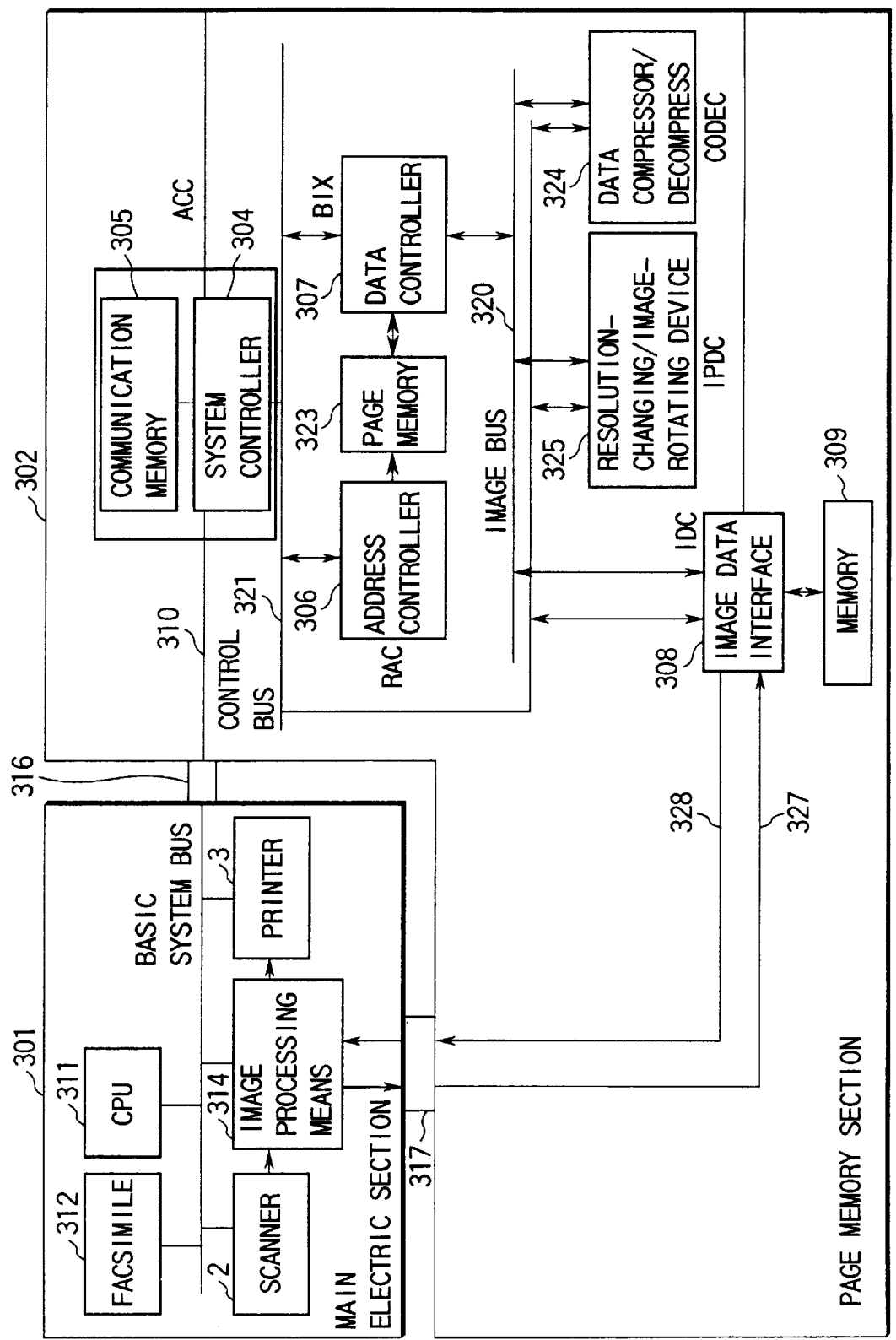
FIG. 2 is a block diagram showing the electrical structure of the image forming apparatus.
Figure 3:
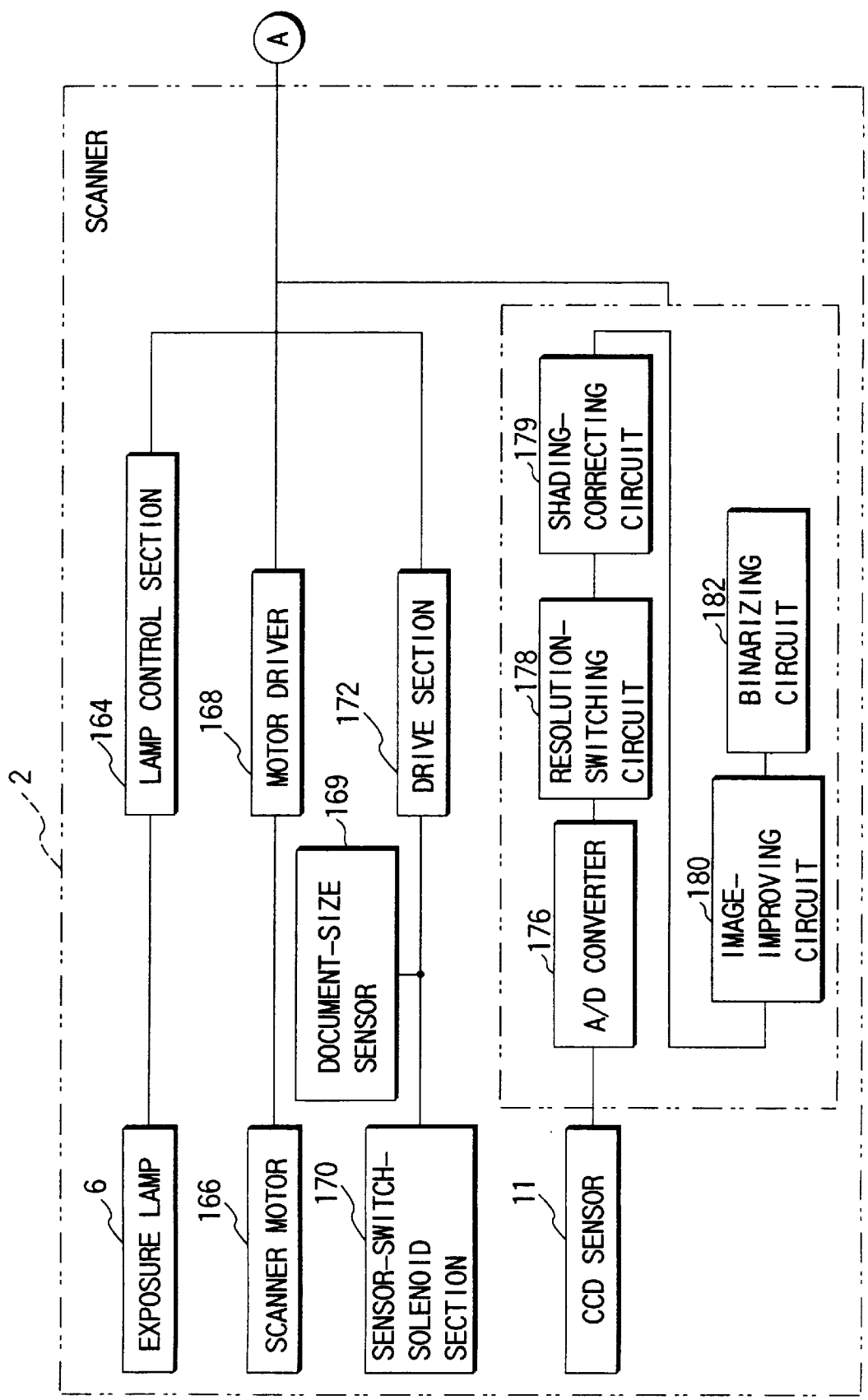
FIG. 3 is a block diagram of a scanner of the image forming apparatus.
Figure 4:
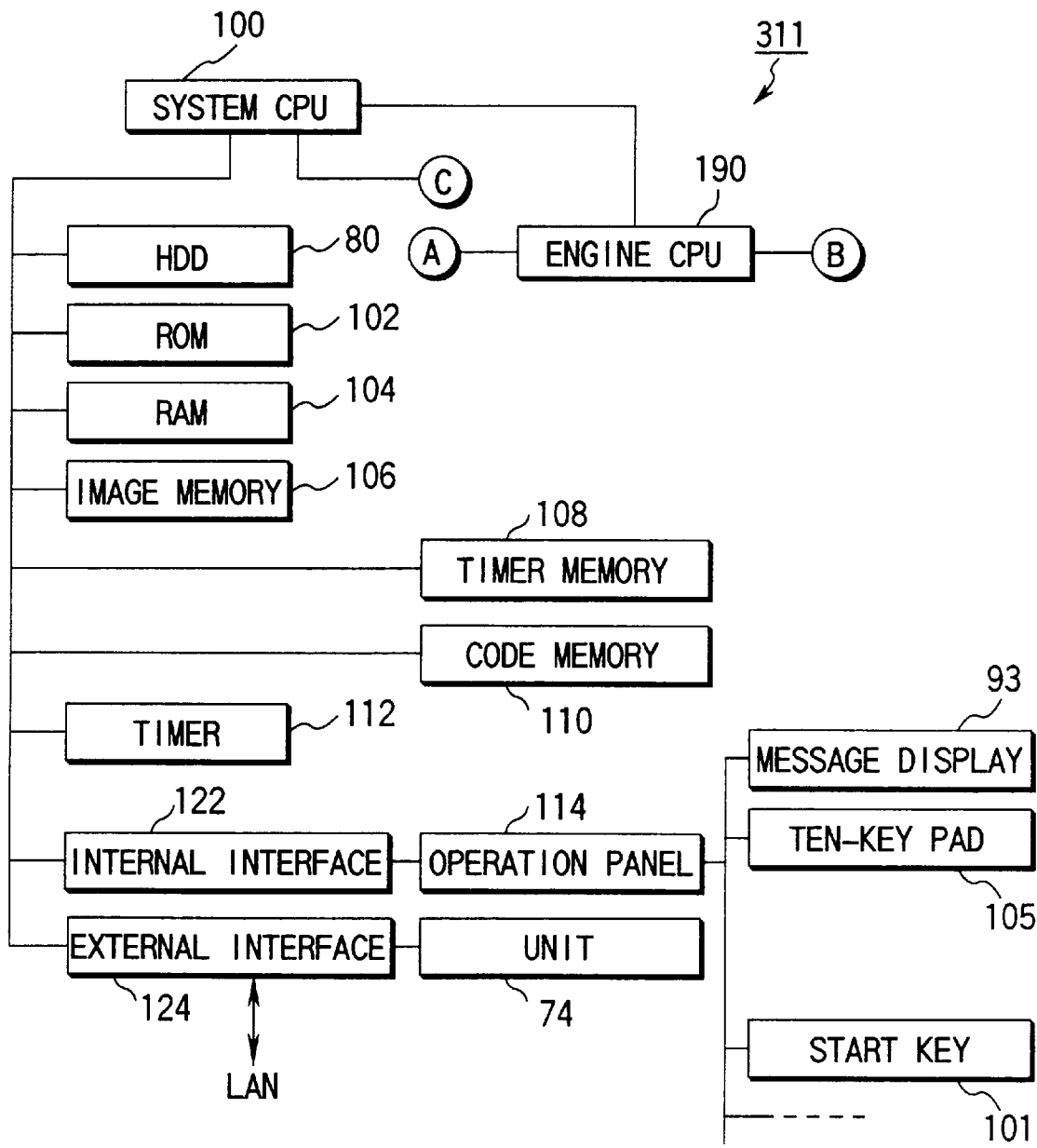
FIG. 4 is a block diagram of a central processing unit (CPU) of the image forming apparatus.
Figure 5:
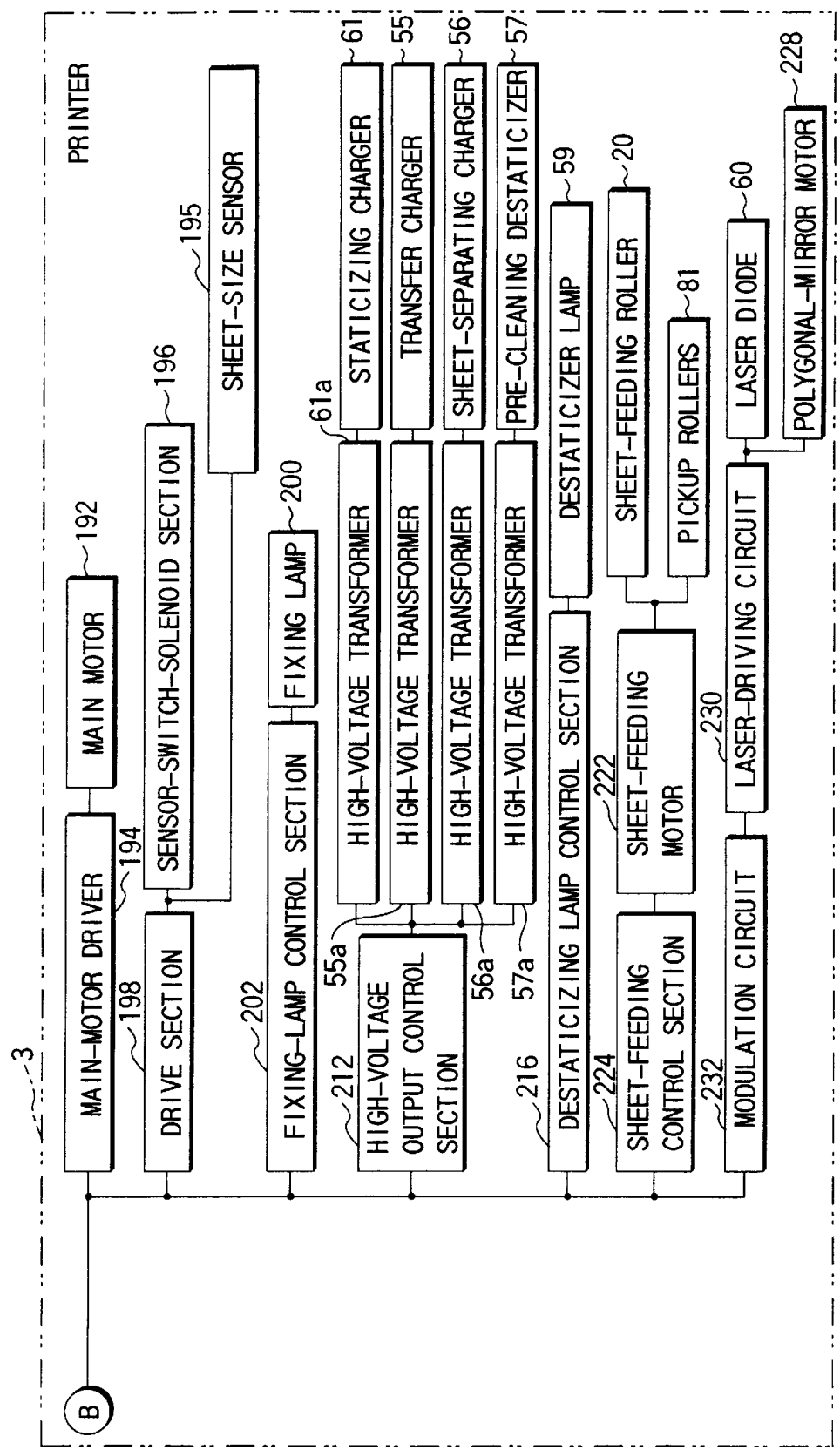
FIG. 5 is a block diagram of the printer of the image forming apparatus.
Figure 6:
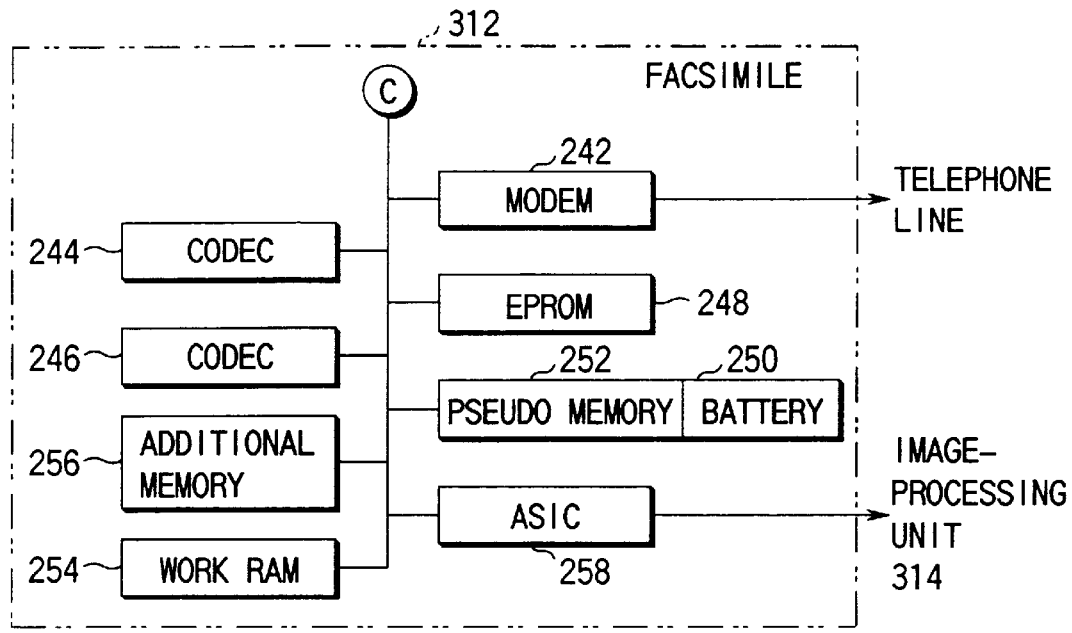
FIG. 6 is a block diagram of a facsimile device incorporated in the image forming apparatus.

The electric components of the digital copying machine 1 will be described, with reference to FIGS. 2 to 6. FIG. 2 shows all electric components of the digital copying machine 1. FIG. 3 illustrates the scanner 2. FIG. 4 illustrates a main control section 301. FIG. 5 illustrates the printer 3, and FIG. 6 illustrates a facsimile (FAX) 312.

Referring to FIG. 2, the digital copying machine 1 comprises two electric sections, a main control section 301 and a page memory section 302. The main control section 301 comprises the scanner 2, the printer 3, a central processing unit (CPU) 311, the facsimile 312, and an image-processing unit 314. The CPU 311 controls the scanner 2, the printer 3, the facsimile 312, and the image processing unit 314. The scanner 2 and the printer 3 are connected by the image-processing unit 314. The page memory section 302 stores image data supplied from the main control section 301, and processes the image data and transfers it back to the main control section 301.

The main control section 301 and the page memory section 302 are connected by a system interface 316 and an image data interface 317. Control data is transferred between the sections 301 and 302 through the system interface 316. Image data is transferred between the sections 301 and 302 through the image data interface 317.

Referring to FIG. 4, the CPU 311 comprises a system CPU 100, a hard disk drive (HDD) 80, a read only memory (ROM) 102, a random access memory (RAM) 104, an image memory 106, a timer 112, an internal interface 122 and an external interface 124. The components 80, 102, 104, 106, 112, 122 and 124 are connected to the CPU 100.

The hard disk drive 80 is a memory for storing image data and job files, each consisting of image data and job data (e.g., print data). An operation panel 114 is connected to the internal interface 122. A message display 93, a ten-key pad 105, a start key 101, and the like are mounted on the operation panel 114. A unit 74 is connected to the external interface 124. An external device (e.g., a personal computer) can be connected to the external interface 124 by a communication line, such as a LAN line. An engine CPU 190 and the facsimile (FAX) 312 (FIG. 2) are connected to the system CPU 100. The engine CPU 190 controls the scanner 2 and the printer 3.

The scanner 2 will be described in detail with reference to FIG. 3. Referring now to FIG. 3, the scanner 2 comprises an exposure lamp 6, a charge coupled device (CCD) sensor 11, a lamp control section 164, a scanner motor 166, a motor driver 168, a document-size sensor 169, a sensor-switch-solenoid section 170, a drive section 172, an analog-to-digital (A/D) converter 176, and a resolution-switching circuit 178. The scanner 2 further comprises a shading correcting circuit 179, an image-improving circuit 180, and a binarizing circuit 182.

The lamp control section 164, the motor driver 168 and the drive section 172 are connected to the engine CPU 190 (FIG. 4) and controlled by the engine CPU 190. The engine CPU 190 is connected to the A/D converter 176 and the circuits 178, 179, 180 and 182, for controlling the converter 176 and the circuits 178, 179, 180 and 182. The lamp control section 164 controls the exposure lamp 6, and the motor driver 168 controls the scanner motor 166. The drive section 172 drives the document-size sensor 169 and the sensors, switches and solenoids included in the section 170. The circuit 176, 178, 179, 180 and 182 cooperate to process the image data supplied from the CCD sensor 11.

The printer 3 will be described in detail, with reference to FIG. 5. Referring now to FIG. 5, the printer 3 comprises the sheet-feeding roller 20, the transfer charger 55, the sheet-separating charger 56, the pre-cleaning destaticizer 57, the destaticizing lamp 59, the laser diode 60, the staticizing charger 61 and pickup rollers 81—all described above. The printer 3 further comprises high-voltage transformers 55a, 56a, 57a and 61a. The printer 3 still further comprises a main motor 192, a main-motor driver 194, a sheet-size sensor 195, a sensor-switch-solenoid section 196, a drive section 198, a fixing lamp 200, a fixing lamp control section 202, a high-voltage output control section 212, a destaticizing lamp control section 216, a sheet-feeding motor 222, a sheet-feeding control section 224, a laser-driving circuit 230, a modulation circuit 232, and a polygonal mirror motor 228.

The main-motor driver 194, the drive section 198, the fixing-lamp control section 202, the high-voltage output control section 212, the destaticizing lamp control section 216, the sheet feeding control section 224 and the modulation circuit 232 are connected to the engine CPU 190 and controlled by the CPU 190. The driver 194 drives the main motor 192. The drive section 198 drives the sheet-size sensor 195 and the sensor, switches and solenoids included in the sensor-switch-solenoid section 196. The control section 202 controls the fixing lamp 200. The high-voltage transformers 55a, 56a, 57a and 61a are connected at one end to the transfer charger 55, the sheet-separating charger 56. The pre-cleaning destaticizer 57, and the staticizing charger 61, respectively, and at the other end to the high-voltage output control section 212. The control section 212 controls the high-voltage transformers 55a, 56a, 57a and 61a. The control section 216 controls the destaticizing lamp 59. The control section 224 controls the sheet-feeding motor 222, which drives the sheet-feeding roller 20 and the pickup rollers 81. The modulation circuit 232 controls the laser-driving circuit 230, which drives the laser diode 60 and the polygonal mirror motor 228.

The page memory section 302 will be described with reference to FIG. 2. Referring again to FIG. 2, the page memory section 302 comprises a system controller 304, an address controller 306, a data controller 307, an image data interface (I/F) 308, a memory 309, an image bus 320, a control bus 321, a page memory (PM) 323, a data compressor/decompressor (CODEC) 324, and a resolution changing/image-rotating device (IPDC) 325.

The system controller 304 has a communication memory 305 and controls access to the page memory 323 from the main electric section 301. A line 310 couples the system controller 304 to the system interface 316. The page memory 323 temporarily stores image data. The address controller 306 generates address data for designating any address in the page memory 302. The image bus 320 transfers data among the data controller 307, the image data interface 308, the data compressor/decompressor 324, and the resolution-changing/image rotating device 325. The control bus 321 transfers control data among the system controller 304, the address controller 306, and the data controller 307, the image data interface 308, the data compressor/decompressor 324, and the resolution changing/imaging rotating device 325. The data controller 307 controls the transfer of image data through the image bus 320. The image data interface 308 receives via a line 327 image data from, and supplies via a line 328 image data to, the image data interface 317 which connects the page memory section 302 to the main control section 301.

The resolution changing/image rotating device 325 changes the resolution of the image represented by data. Therefore, the image data generated by the scanner 2 can be supplied to an external device whose image resolution differs from that of the scanner 2, and the data generated by an external device can be supplied to the printer 3 whose image resolution differs from that of the external device. The resolution-changing/image rotating device 325 processes image data so that the image represented by the data may be rotated by 90 degrees. The data compressor/decompressor 324 compresses image data before the data is transmitted from the facsimile 312 and recorded on a recording media, such as an optical disk, and decompresses image data before the image represented by the data is printed.

The image data interface 308 provides data having its resolution changed by the resolution changing/image rotating device 325 or being compressed or decompressed by the data compressor/decompressor 324 via the line 328 to the image data interface 317. The image processing unit 314 provides processed data via the image data interface 317 and the line 327 to the image data interface 308. Commands corresponding to data input or output through the lines 327 and 328 are transferred to the system controller 304 via the system interface 316 and the line 310. Such commands may be, for example, to set registers of the page memory. The memory 308 is connected to the image data interface 309. The memory 309 temporarily stores the image data processed by the resolution-changing/image rotating device 325 and represents an image rotated by either 90 degrees or −90 degrees, before the image data is supplied to the printer 3.

The facsimile 312 will be described with reference to FIG. 6. The facsimile 312 is connected to a public telephone line. Referring to FIG. 6, the facsimile 312 comprises a modem 242, CODECs 244 and 246, an erasable programmable read only memory (EPROM) 248, a battery 250, a pseudo memory 252, a work memory 254, an additional memory 256, and a facsimile interface 258. The modem 242 is connected to the telephone line for modulating and demodulating image data. The CODECs 244 and 246 coded and decode binary image data. The EPROM 248 stores a communication control program. The battery 250 is connected to the pseudo memory 252. The pseudo memory 252 may be, for example, static random access memory (SRAM). Supplied with power from the battery 250, the pseudo memory 252 can store image data. The work memory 254 processes image data in various ways. The work memory 254 may be, for example, random access memory (RAM). The additional memory 256 may store the image data overflowing the work memory 254. The facsimile interface 258 is an interface for supplying the image data from the facsimile 312 to the image-processing unit 314.

Figure 7:
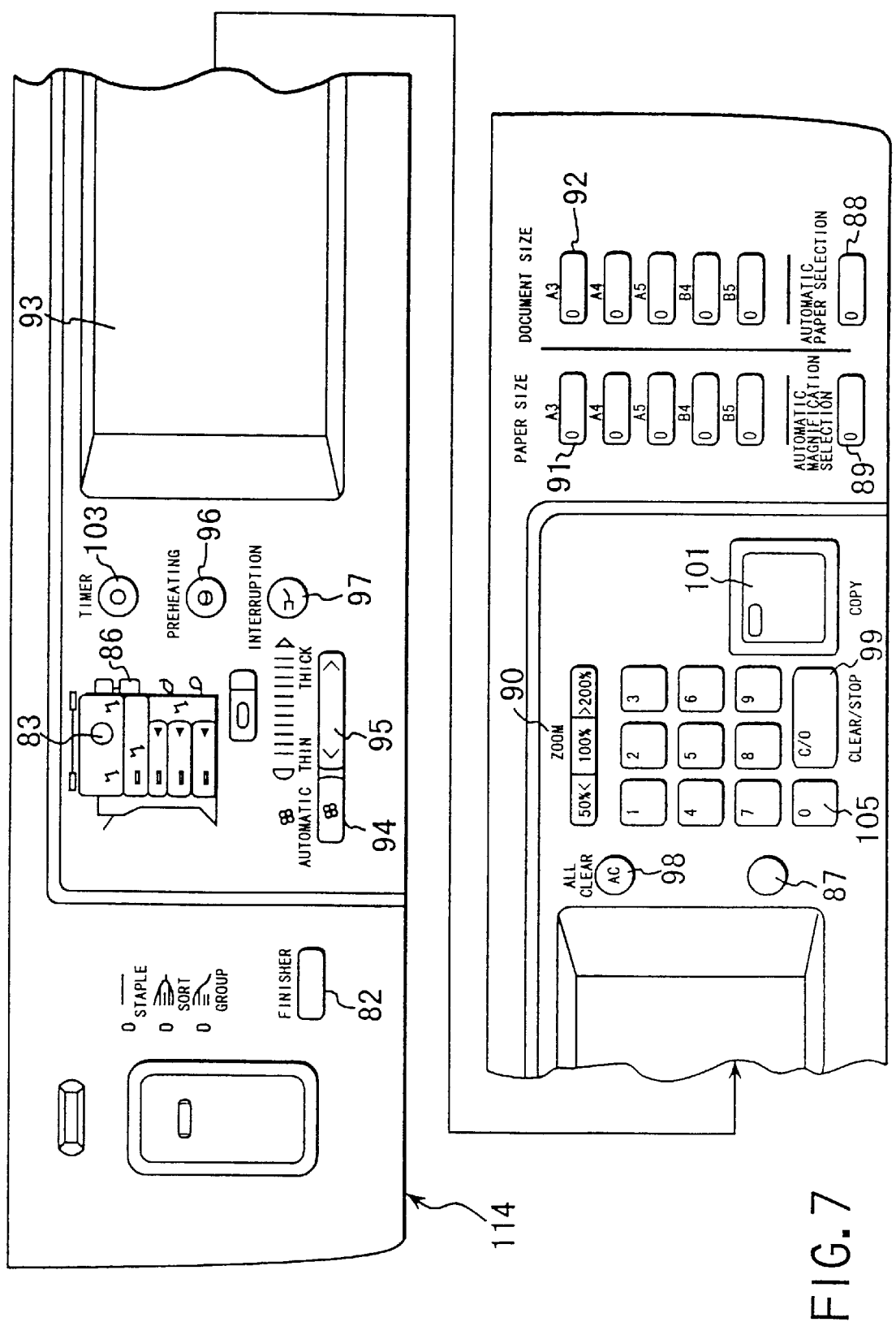
FIG. 7 is a front view of the operation panel of the image-forming apparatus.

The operation panel 114 (FIG. 2) will now be described with reference to FIG. 7. As FIG. 7 shows, the operation panel 114 has a finish key 82, an operating condition display 83, a cassette-selecting key 86, a help key 87, an automatic sheet-selecting key 88, an automatic magnification-selecting key 89, a zooming/100% key unit 90, document-size keys 91, sheet-size keys 92, a message display 93, an automatic density-selecting key 94, a manual density-selecting key unit 95, a preheating key 96, an interruption key 97, an all-clear key 98, a clear/stop key 99, a start key 101, a timer key 103, and a ten-key pad 105.

The finish key 82 is pushed to set the digital copying machine 1 in a sorting mode, grouping mode or stapling mode. The operating condition display 83 displays various icons, indicating the condition in which the copying machine 1 is operating. The cassette selecting key 86 is depressed when the paper cassette 30 selected is not of a desired size, to select the paper cassette 30 of the desired size. The help key 87 is pushed to display messages on the message display 93, informing the operator of the operation sequence of the digital copying machine 1. When pushed after the user has set desired functions, the desired functions are displayed on the message display 93.

When the power switch (not shown) of the digital copying machine 1 is turned on, the automatic sheet-selecting key 88 sets an automatic sheet-selecting mode. When a document is placed on the document table 5, the size of the document is detected. The sheets of the same size as the document are automatically selected, provided that the copy magnification selected is 100%.

The automatic magnification-selecting key 89 is pushed to select automatic magnification-selecting mode. The operator then pushes one of the sheet-size keys 92, designating sheets of the desired size. Then, an appropriate copy magnification is automatically calculated on the basis of the sheet size designated and the size of the document placed on the table 5.

The zooming/100% key unit 90 comprises a "25%<" key, a "100%" key, and a ">200%". When the "25%<" key is repeatedly depressed, the copy magnification is decreased to 25%, each time by 1%. Then the ">200%" key is repeatedly depressed, the copy magnification is increased up to 200%, each time by 1%. When the "100%" key is pushed, the copy magnification is set at 100%.

The document-size keys 91 set the size of the document placed on the table 5. When any one of these keys 91 is pushed the size of the document is set. After sheets of a desired size are selected, a proper copy magnification is automatically calculated and set. The sheet-size keys 92 select sheets of various sizes. When any one of sheet-size keys 92 is depressed, the sheets of the size designated by the key 92 depressed are selected.

The message display 93 displays messages and icons, informing the operator of the condition in which the digital copying machine 1 is operating and also the sequence of operations which the digital copying machine 1 is carrying out. The display 93 incorporates a touch panel, which the operator can operate to set desired functions.

When the automatic density-selecting key 94 is depressed, the density of the data printed on the document which is placed on the table 5 is detected, and an optimal copy density is automatically selected. The manual density-selecting key unit 95 comprises two keys, e.g., a low-density key and a high-density key. The low-density key is pushed to set any one of five low copy densities. The high-density key is pushed to set five high copy densities.

When depressed, the preheating key 96 turns off all display lamps and sets the digital copying machine 1 in preheating (power-saving) mode. To make copies of a document, the operator pushes the preheating key 96, thereby releasing the digital copying machine 1 from the preheating mode.

The interruption key 97 is pushed to interrupt or suspend the copying operation, so that the operator may remove the document from the table 5 and place another document thereon to copy the other document. The all-clear key 98 is depressed to clear all modes set by the operator, setting the digital copying machine 1 in the standard copying mode. The clear/stop key 99 is pushed to correct the number of copies preset or to stop the copying operation. The start key 101 is pushed to start the copying operation.

When the timer key 103 is depressed, the display 93 displays the time when the power switch of the digital copying machine 1 will be turned on or off automatically, provided that a weekly time is set. The ten-key pad 105 is operated to set the number of copies to make. The number of copies can be set at any value ranging from 1 to 999.

Figure 8:
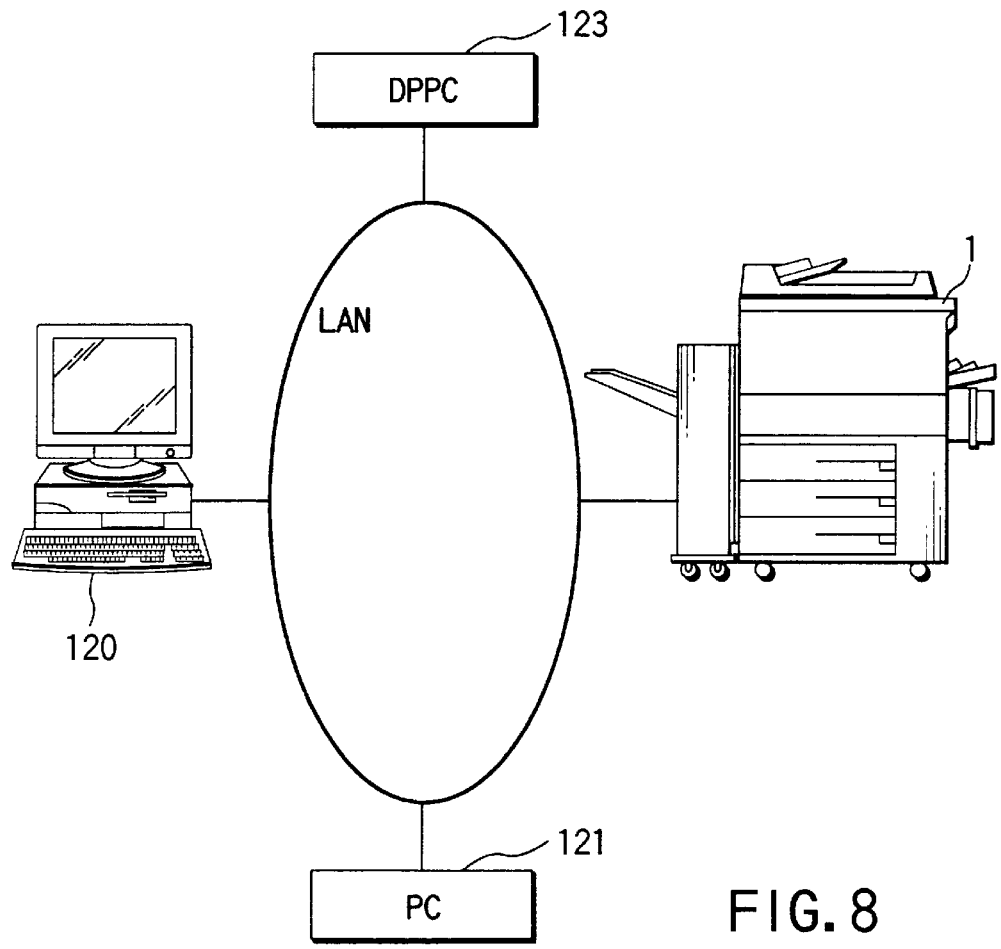
FIG. 8 is a diagram showing an image forming system which incorporates the image forming apparatus.

As illustrated in FIG. 8, the digital copying machine 1 may be connected to a LAN(Local Area Network), along with a host computer 120, a personal computer 121 and another digital copying machine (DPPC) 123. In this case, the copying machines 1 and 123 and the computers 120 and 121 constitute an image forming system.

A conventional job file stored in a hard disk drive will be described with reference to FIG. 9. The print data supplied from the host computer 120 through the LAN is divided into job data and page data. The job data is stored in a job header and the page data is stored in page headers, and image data is stored in a storage area which follows the page headers, respectively. As shown in FIG. 9, the job file consists of one job header, a plurality of page headers and a plurality of image-data storage areas. Each image-data storage area follows one page header. Stored in the job header are data items which represent the number of copies to be made, the double-side print mode, the order of printing pages, the sorting mode, the image reducing/combining print mode and the total number of copies. Stored in each page header are data items which represent the desired size of sheets, the source of sheets and the type of image data. Stored in each image-data storage area is one page of image data.

FIG. 10 illustrates an example of the print data supplied from the host computer 120 through the LAN. As shown in FIG. 10, the print data consists of a host data item and a plurality of page-data items. The host data item represents the number of copies (e.g., 10 copies), the double-side print mode (e.g., selected, portrait positioning), the order of printing pages (e.g., reverse order), the sorting mode (e.g., selected), and the image reducing/combining print mode (e.g., 2 in 1). The first page-data item represents the sheet size (e.g., A4 size), the sheet source (e.g., the upper cassette), and the type of image data (e.g., compressed, A4 size). The second page-data item represents the sheet size (e.g., A3 size), the sheet source (e.g., the lower cassette), and the type of image data (e.g., compressed, A3 size). The third page-data item represents the sheet size (e.g., A3 size), the sheet source (e.g., the lower cassette), and the type of image data (e.g., not compressed, A3 size). The fourth page-data item represents the sheet size (e.g., B4 size), the sheet source (e.g., the large-capacity feeder), and the type of image data (e.g., compressed, B4 size). The fifth page-data item represents the sheet size (e.g., B4 size), the sheet source (e.g., the large-capacity feeder), and the type of image data (e.g., compressed, B4 size).

FIG. 11 shows the structure of the conventional job file generated from the print data illustrated in FIG. 10, for a case of a double sided print mode. Stored in the job header of this job file are the number of copies (e.g., 10 copies), the double-side print mode (e.g., selected, portrait positioning), the order of printing pages (e.g., reverse), the sorting mode (e.g., selected), and the total number pages (e.g., 5 pages). Stored in the first page header are the desired sheet size (e.g., A4 size), the sheet source (e.g., the upper cassette), and the type of image data (e.g., compressed, A4 size). Stored in the first image-data storage area is data representing an A4-size image. Stored in the second page header are the desired sheet size (e.g., A3 size), the sheet source (e.g., the lower cassette), and the type of image data (e.g., compressed, A3 size). Stored in the second image-data storage area is data representing an A3-size image. Stored in the third page header are the desired sheet size (e.g., A3 size), the sheet source (e.g., the lower cassette), and the type of image data (e.g., not compressed, A3 size). Stored in the second image-data storage area is data representing an A3-size image. Stored in the fourth page header are the desired sheet size (e.g., B4 size), the sheet source (e.g., the large-capacity feeder), and the type of image data (e.g., compressed, B4 size). Stored in the fourth image-data storage area is data representing a B4-size image. Stored in the fifth page header are the desired sheet size (e.g., B4 size), the sheet source (e.g., the large-cassette feeder), and the type of image data (e.g., compressed, B4 size). Stored in the second image-data storage area is data representing a B4-size image.

In the previous conventional way of printing, when it is necessary to refer to the next page information, for example in the case of double sided printing, the CPU processes the printing job by referring to the next page information in processing every page information. Therefore, it takes a lot of time to finish the printing job.

In the present invention, the CPU gathers the job files which have common printing conditions, and generates one job file. It is not necessary to refer to the next page information. In this embodiment, three job files are generated from the print data shown in FIG. 10 which is stored in the hard disk drive 80 of the digital copying machine 1. These three job files will be described, with reference to FIGS. 12A, 12B and 12C.

As shown in FIG. 12A, the first job file consists of one job header, one page header and one image-data storage area. Stored in the job header are the number of copies (e.g., 10 copies), the sheet size (e.g., A4 ), the sheet source (e.g., the upper cassette), the double-side print mode (e.g., not selected), and the order of printing pages (e.g., reverse), the sorting mode (e.g., selected), and the total number of pages (e.g., 1 page). Stored in the page header is the type of image data only (e.g., compressed). Stored in the image-data storage area is data representing an A4-size image.

As shown in FIG. 12B, the second job file consists of one job header, two page headers and two image-data storage areas. Stored in the job header are the number of copies (e.g., 10 copies), the sheet size (e.g., A3 ), the sheet source (e.g., the lower cassette), the double-side print mode (e.g., selected, portrait positioning), the order of printing pages (e.g., reverse), the sorting mode (e.g., selected), and the total number of pages (e.g., 2 pages). Stored in the first page header is the type of image data only (e.g., compressed). Stored in the first image-data storage area is data representing an A3-size image. Stored in the second page header is the type of image data only (e.g., not compressed). Stored in the second image-data storage area is data representing an A3-size image.

As shown in FIG. 12C, the third job file consists of one job header, two page header and two image-data storage areas. Stored in the job header are the number of copies (e.g., 10 copies), the sheet size (e.g., B4 ), the sheet source (e.g., the large-capacity feeder), the double-side print mode (e.g., selected, portrait positioning), the order of printing pages (e.g., reverse), the sorting mode (e.g., selected), and the total number of pages (e.g., 2 pages). Stored in the first page header is the type of image data only (e.g., compressed). Stored in the first image-data storage area is data representing a B4-size image. Stored in the second page header is the type of image data only (e.g., compressed). Stored in the second image-data storage area is data representing a B4-size image.

Figure 13:
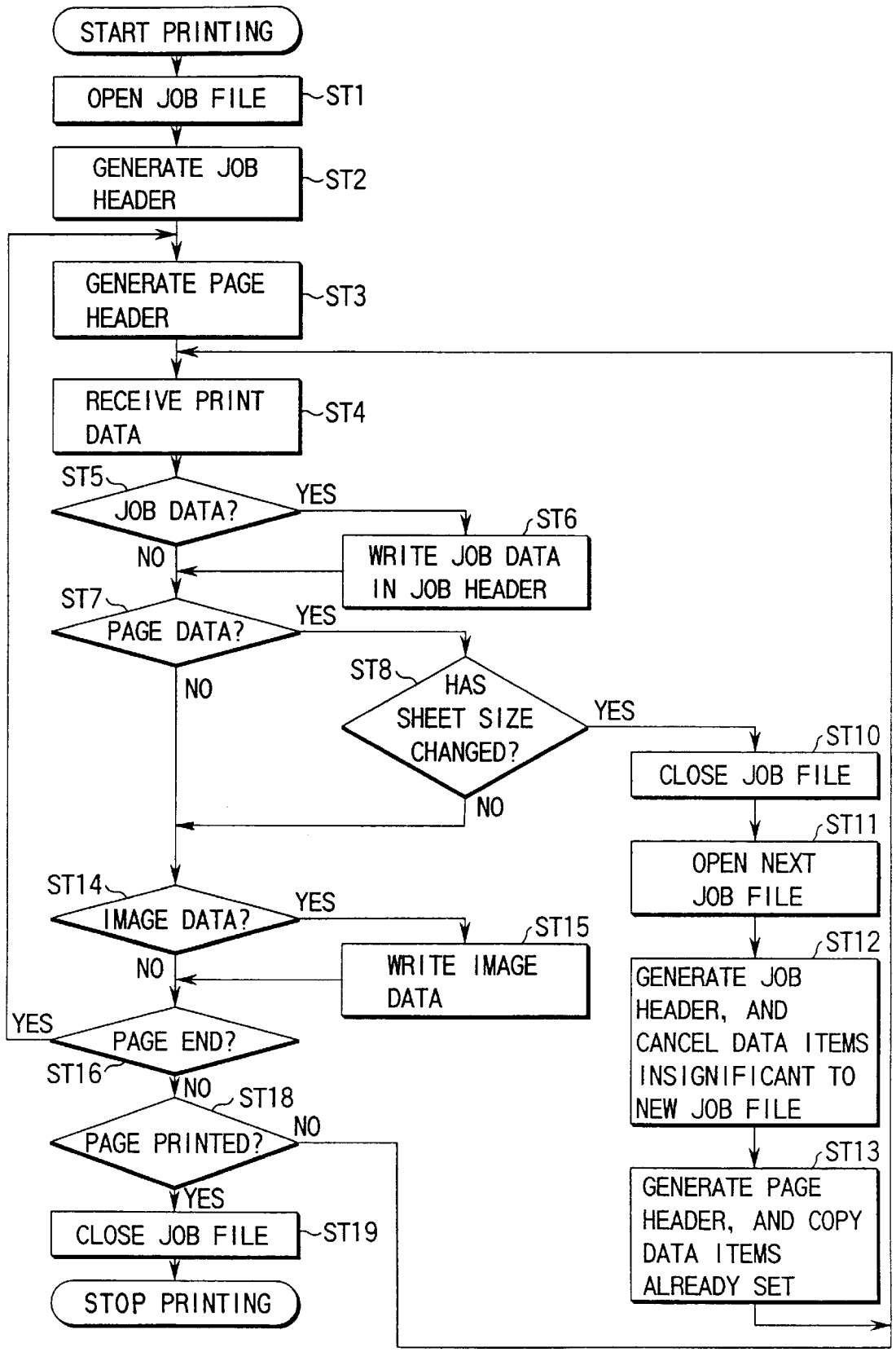
FIG. 13 is a flow chart illustrating the generation of a job file of the first type in the image forming apparatus according to the present invention.

How the job files shown in FIGS. 12A, 12B and 12C are generated will be explained, with reference to the flow chart of FIG. 13.

Assume that the host computer 120 transmits the print data (FIG. 10) to the digital copying machine 1. In the digital copying machine 1, the system CPU 100 opens the file stored in the hard disk drive 80 (ST1), generates a job header (ST2), and generates page headers (ST3). Then, the system CPU 100 receives the print data through the external interface 124 (ST4). The CPU 100 determines whether the data received is job data or not (ST5). If YES in the step ST5, the CPU 100 writes the data in the job header generated in the step ST2 (ST6).

If NO in the step ST5 or after the step ST6, the CPU 100 determines whether the data received is page data or not (ST7). If YES in the step ST7, the CPU 100 determines whether or not the sheet size has changed (ST8). If YES in the step ST8, the CPU 100 closes the job file and generates a new job file (ST10). Next, the CPU 100 opens the new job file, e.g., next job file (ST11). The CPU 100 generates a job header and cancels data items insignificant to the next job file (ST12). Further, the CPU 100 copies the items already set, thereby generating a new page header (ST13). Then, the operation returns to the step ST4.

If NO in the step ST7 or NO in the step ST8, the CPU 100 determines whether the data received is image data (ST14). If YES in the step ST14, the CPU 100 writes the image data in the job file in the storage area which follows the page header generated in the step ST3 or ST13 (ST15). The CPU 100 determines whether or not the end of the page has been reached (ST16). If YES in the step ST16, the operation returns to the step ST3.

If NO in the step ST16, the CPU 100 determines whether the page has been printed (ST18). If NO in the step ST18, the operation returns to the step ST4. If YES in the step ST18, the CPU 100 closes the job file (ST19) and stores the print data into the hard disk drive 80.

In the main control section 301, the CPU 311 supplies the job files shown in FIGS. 12A, 12B and 12C to the printer 3. As a result, the printer 3 prints data first on one A4-size sheet in accordance with the first job file (FIG. 12A), then on two A3-size sheets in accordance with the second job file (FIG. 12B), and finally on two B4-size sheets in accordance with the third job file (FIG. 12C). In the present invention, a plurality of page data which has a common condition essential to complete the selected job are collected into one job file. Because it is not necessary to set the page data in printing every pages, it saves time for completing the printing job.

Figure 14:
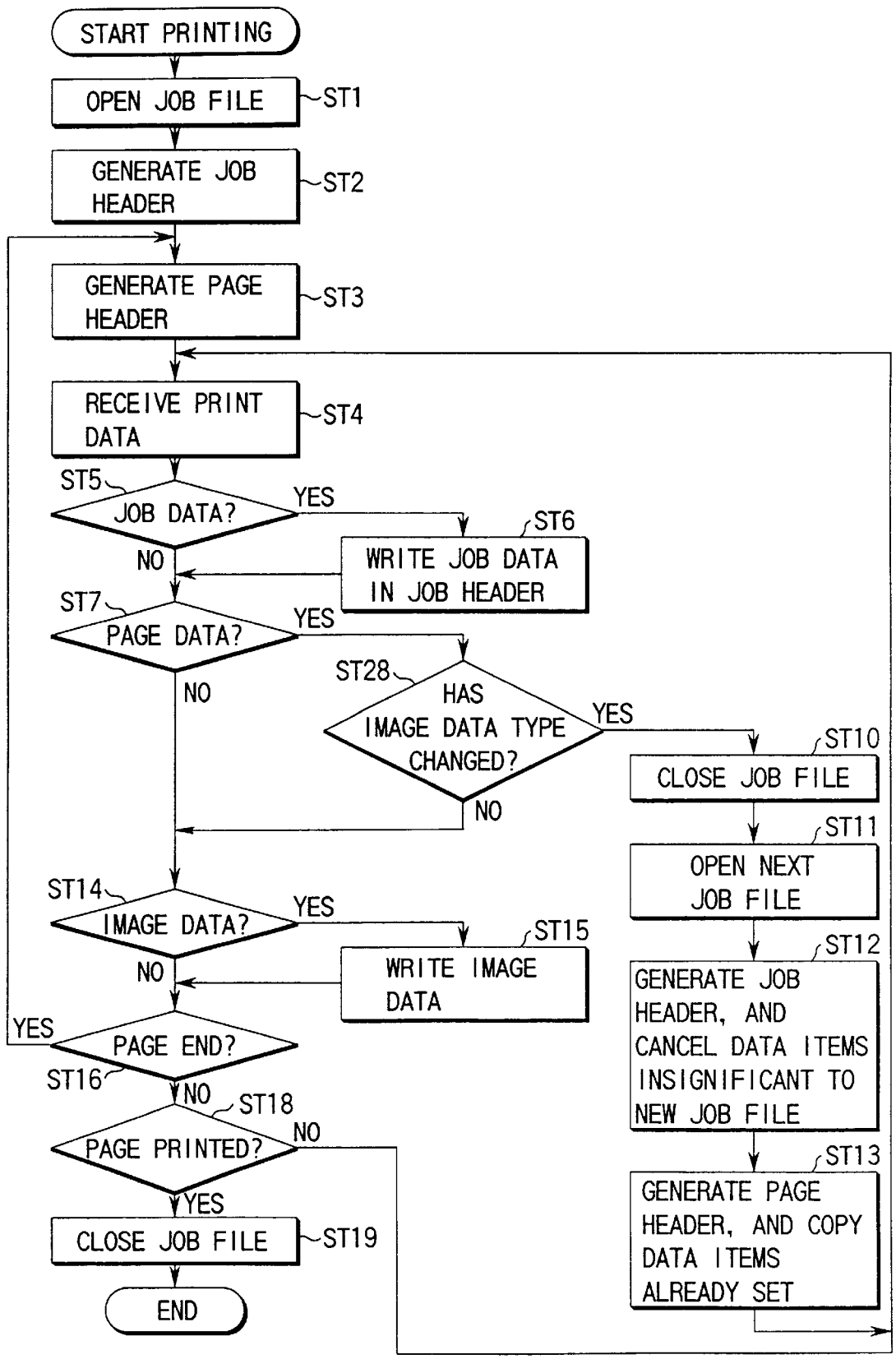
FIG. 14 is a flow chart illustrating the generation of a job file of the second type in the image forming apparatus of the present invention.

As explained above, one job file is closed and the next job file is opened every time the system CPU 100 determines in the step ST8 that the sheet size has changed. Instead, a job file and the next job file may be closed and opened, respectively, every time the type of image data changes, from data compressed to data not compressed, or vice versa, as can be understood from the flow chart of FIG. 14. The flowchart of FIG. 14 is identical to the flowchart of FIG. 13 except a step ST28 replaces the step ST8 of FIG. 13. During the step ST28, the CPU 100 determines whether or not the image data type has changed. If YES in the step ST28, the CPU 100 executes the step ST10. If NO in the step ST28, the CPU 100 executes the step ST14.

Figure 15:
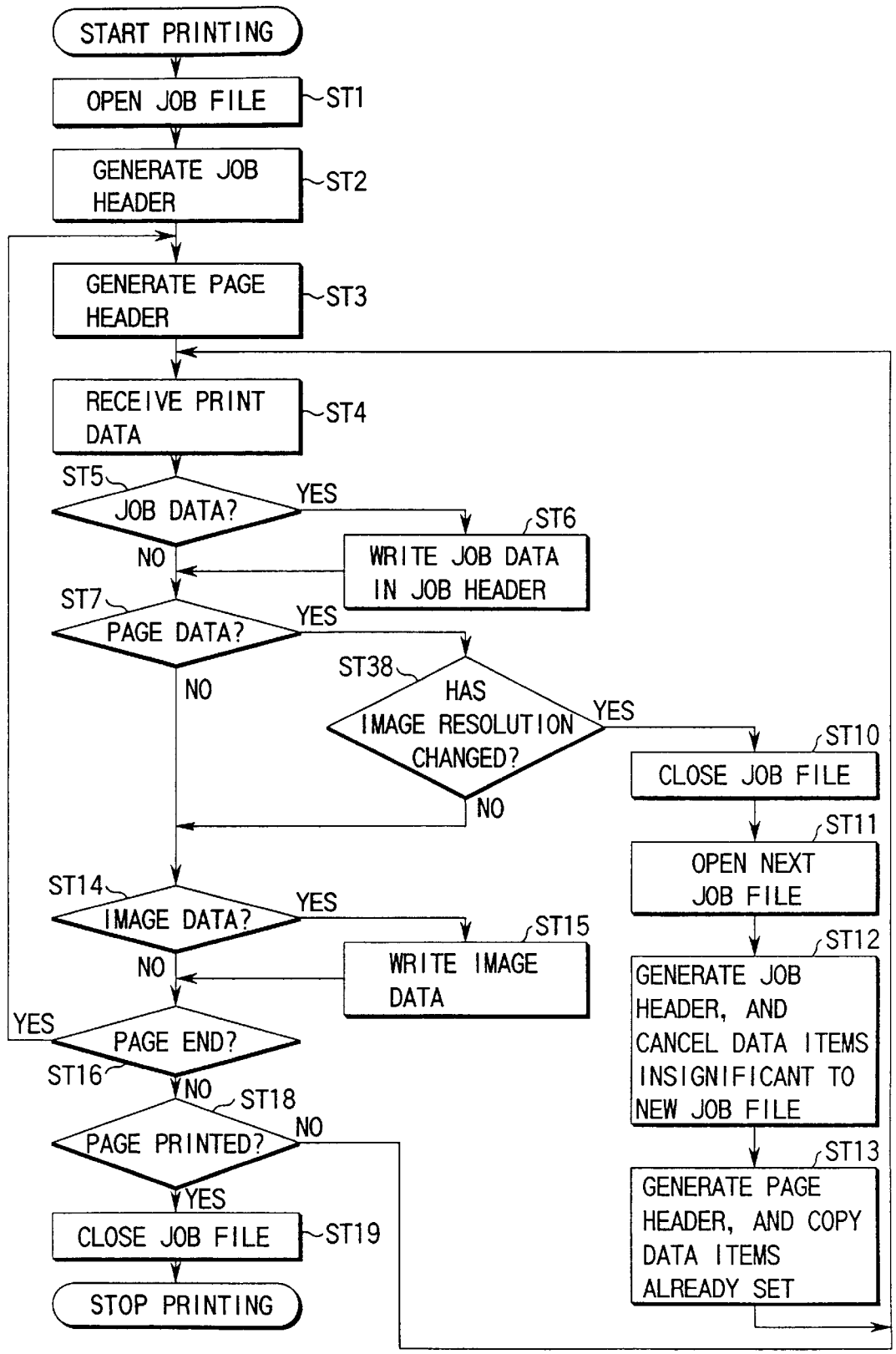
FIG. 15 is a flow chart illustrating the generation of a job file of the third type in the image forming apparatus of the present invention.

Alternatively, a job file and the next job file may be closed and opened, respectively, every time the resolution of image data changes, as can be understood from the flow chart of FIG. 15. The flowchart of FIG. 15 is identical to the flowchart of FIG. 13 except a step ST38 replaces the step ST8 of FIG. 13. During the step ST38, the CPU 100 determines whether or not the image resolution has changed. If YES in the step ST38, the CPU 100 executes the step ST10. If NO in the step ST38, the CPU 100 executes the step ST14.

Figure 16A:
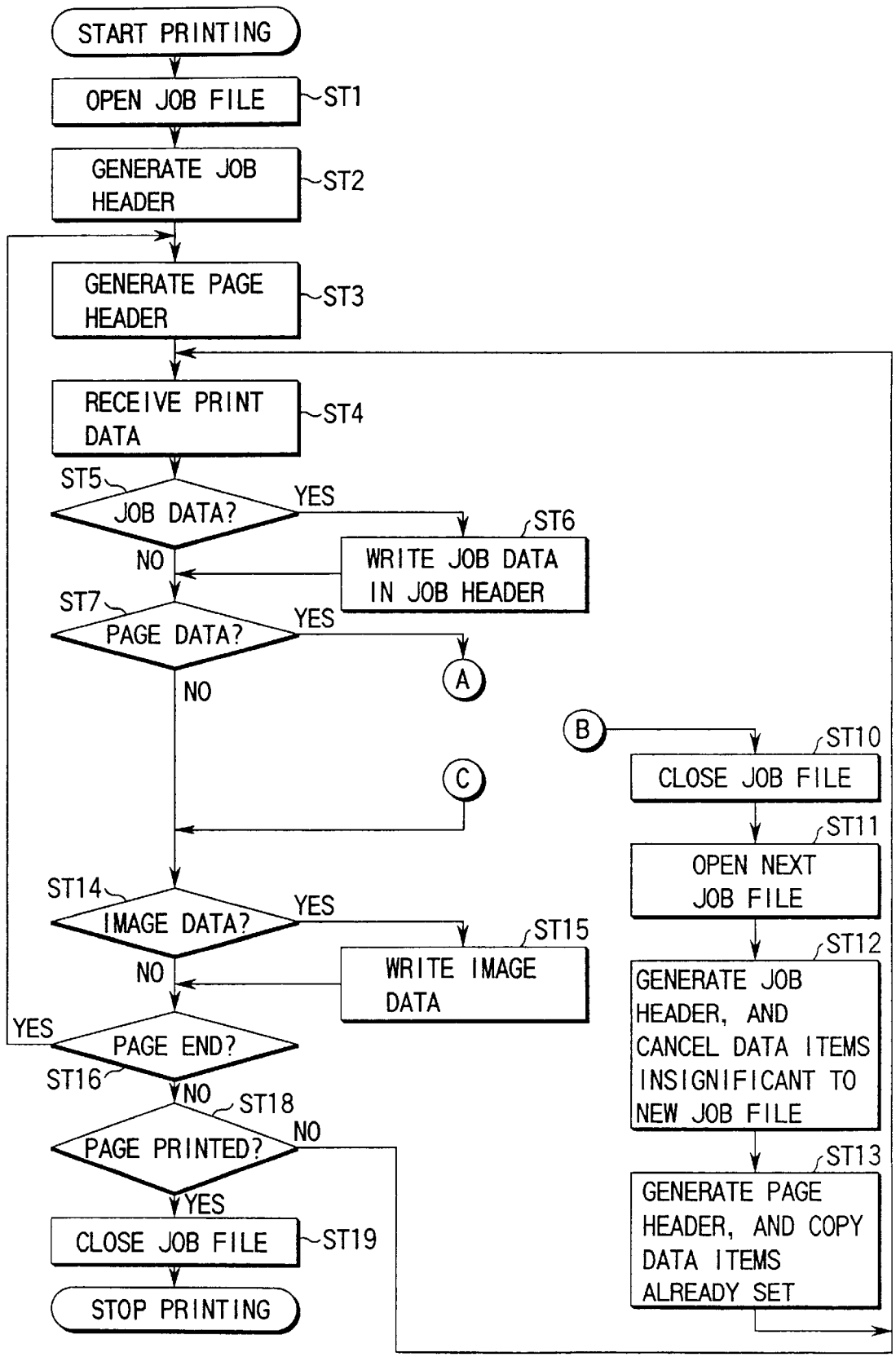
FIGS. 16A and 16B is a flow chart illustrating the generation of a job file of the fourth type in the image forming apparatus of the present invention.
Figure 16B:
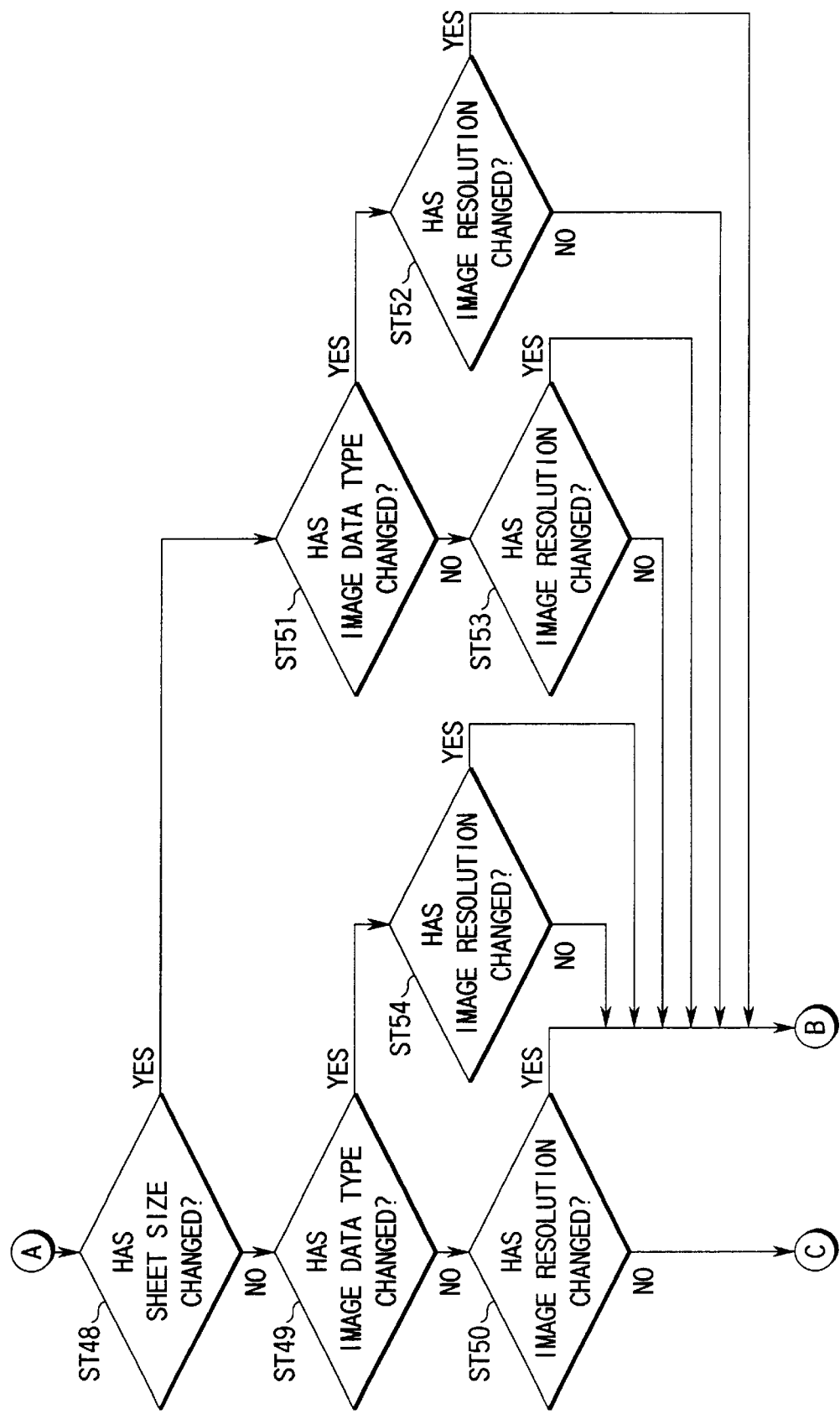

Still alternatively, as shown in the flow chart of FIGS. 16A and 16B, a job file and the next job file may be closed and opened, respectively, if the system CPU 100 determines in steps ST48 to ST54 that the sheet size, the image data type or the image resolution have changed. More specifically, the CPU 100 may determine in the step ST48 that the sheet size has changed, determine in the step ST51 that the image data type has changed, and determine in the step ST52 that the image resolution has changed, and it closes the job file and generates a new job file (ST10). If this is the case, the CPU 100 opens the new job file, e.g., the next job file (ST11). The CPU 100 cancels data items insignificant to the second job file (ST12). The CPU 100 then copies the items already set, thereby generating a job header (ST13). Then, the operation returns to the step ST4.

The system CPU 100 closes the previous job file and opens a new job file when at least one of the attributes of the image data has changed. If the next image data has the common attribute as the present imaged data, the system CPU 100 generates one new job file including both of these image data.

The system CPU 100 may determine in the step ST48 that the sheet size has changed, determine in the step ST51 that the image data type has changed, and determine in the step ST52 that the image resolution has not changed. That is, the CPU 100 may determine that the sheet size and the image data type have changed. In this case, the CPU 100 performs the steps ST10 to ST13, and the operation returns to the step ST4.

The system CPU 100 may determine in the step ST48 that the sheet size has changed, determine in the step ST51 that the image data type has not changed, and determine in the step ST52 that the image resolution has changed. In other words, the CPU 100 may determine that the sheet size and the image resolution have changed. In this case, too, the CPU 100 performs the steps ST10 to ST13, and the operation returns to the step ST4.

The system CPU 100 may determine in the step ST48 that the sheet size has changed, determine in the step ST51 that the image data type has not changed, and determine in the step ST52 that the image resolution has not changed, either. Namely, the CPU 100 may determine that the size sheet only has changed. In this case, too, the CPU 100 performs the steps ST10 to ST13, and the operation returns to the step ST4.

The system CPU 100 may determine in the step ST48 that the sheet size has not changed, determine in the step ST49 that the image data type has changed, and determine in the step ST54 that the image resolution has changed. That is, the image data type and the image resolution have changed. Also in this case, the CPU 100 performs the steps ST10 to ST13, and the operation returns to the step ST4.

The system CPU 100 may determine in the step ST48 that the sheet size has not changed, determine in the step ST49 that the image data type has changed, and determine in the step ST54 that the image resolution has not changed. Namely, the CPU 100 may determine that the image data type only has changed. In this case, too, the CPU 100 performs the steps ST10 to ST13, and the operation returns to the step ST4.

The system CPU 100 may determine in the step ST48 that the sheet size has not changed, determine in the step ST49 that the image data type has not changed, and determine in the step ST50 that the image resolution has changed. In other words, the CPU 100 may determine that the image resolution only has changed. In this case, too, the CPU 100 performs the steps ST10 to ST13, and the operation returns to the step ST4.

The system CPU 100 may determine in the step ST48 that the sheet size has not changed, determine in the step ST49 that the image data type has not changed, and determine in the step ST50 that the image resolution has not changed. If this is the case, the operation executes the step ST14.

Figure 17:
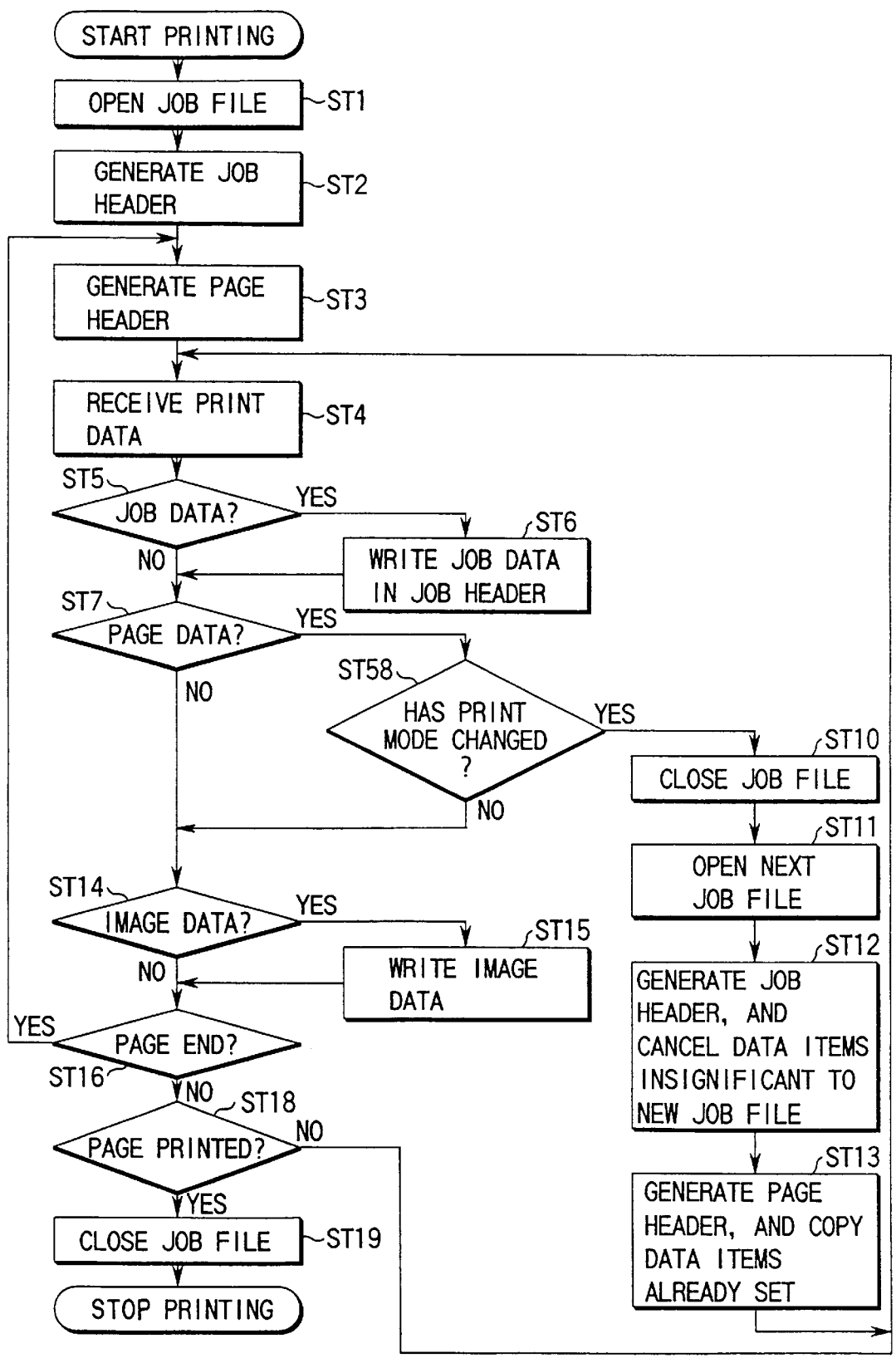
FIG. 17 is a flow chart illustrating the generation of a job file of the fifth type in the image forming apparatus of the present invention.

As described above, one job file is closed and the next job file is opened every time the system CPU 100 determines in the step ST8 that the sheet size has changed. Instead, a job file and the next job file may be closed and opened, respectively, every time the print mode changes from the double-side print mode to the single-side print mode, or vice versa, as can be understood from the flow chart of FIG. 17. The flowchart of FIG. 17 is identical to the flowchart of FIG. 13 except a step ST58 replaces the step ST8 of FIG. 13. During the step ST58, the CPU 100 determines whether or not the print mode changes from one state to another, such as a single-side print mode to a double-side print mode. If YES in the step ST58, the CPU 100 executes the step ST10. If NO in the step ST58, the CPU 100 executes the step ST14.

Furthermore, a job file and the next job file may be closed and opened, respectively, in accordance not only with whether the print mode has changed, but also with whether the sheet size, image data type and/or image resolution has changed as shown in the flow chart of FIGS. 16A and 16B.

As has been described, a plurality of job files are generated in the present invention. Each job file has one job header and contains pages of data which are to be printed on sheets having a common attribute. Hence, these pages can be sequentially printed on paper sheets at higher speed than pages of data are printed on paper sheets having different attributes in accordance with a single job file of the type illustrated in FIG. 9. Since the print data items common to the pages are recorded in the job header of the job file, the job file can be small for the number of pages it contains. Hence, more job files can be stored in the hard disk drive than otherwise.

The embodiments described above show a case of generating one job file when the successive page data has a common attribute. However the present invention also is effective in cases when the page data having the common attribute are not successive. According to the present invention, the page data having the common attribute are collected together to one job file regardless of the successiveness of the page data. For example, in case of printing the page data for each address of the users, the page data having a common address are collected into one job file by dealing the address information with one of attribute data.

The printing module only needs to refer to the contents of the job header to print pages of data, unlike the conventional digital copying machine wherein the module must refer to both the job data and the page data in order to determine the printing sequence which would be the most appropriate. The operating program of the printing module is therefore simple, enabling the module to print pages of data at high speed. Being simple, the operating program can be developed within a relatively short time.

Whenever a new job file is generated, the data items which represent the printing scheme and which are common to any job file are canceled. This helps to increase the speed of printing pages.

I claim:

1. An image forming apparatus comprising:
   receiving means for receiving information transmitted through a communication line and consisting of image-forming data and image data, said image forming data consisting of a plurality of image forming data items each representing conditions of forming one page of image;
   job file generating means for processing the information transmitted to said receiving means, thereby to generate job files each consisting of image data items which represent pages of image to be formed under any identical condition and an image-forming data item which represents said identical condition and other conditions;
   memory means for storing the job files generated by said job file generating means; and
   image-forming means for forming pages of image on recording media in accordance with the job files stored in said memory means, in units of pages which are represented by one job file.

2. An apparatus according to claim 1, wherein said conditions of forming one page of image are the size of the recording media, type of image, resolution of image, and page forming mode.

3. An apparatus according to claim 2, wherein said type of image indicates whether the image data is compressed or not compressed.

4. An apparatus according to claim 2, wherein said page forming mode shows that the image data is printed in double side on the recording media or printed in single side on the recording media.

5. An image forming apparatus comprising:
   receiving means for receiving information transmitted through a communication line and consisting of image-forming data and image data, said image forming data consisting of a plurality of image forming data items each representing a plurality of conditions of forming one page of image;
   job file generating means for processing the information transmitted to said receiving means, thereby to generate job files each consisting of image data items which represent pages of image to be formed under the same conditions and an image-forming data item which represents these conditions;
   memory means for storing the job files generated by said job file generating means; and
   image-forming means for forming pages of image on recording media in accordance with the job files stored in said memory means, in units of pages which are represented by one job file.

6. An apparatus according to claim 5 wherein said plurality of conditions of forming one page of image are the size of the recording media, type of image, resolution of image, and page forming mode, or are some of these.

7. An apparatus according to claim 6, wherein said type of image indicates whether the image data is compressed or not compressed.

8. An apparatus according to claim 6, wherein said page forming mode shows that the image data is printed in double side on the recording media or printed in single side on the recording media.

9. A method of forming images, comprising the steps of:
   receiving information transmitted through a communication line and consisting of image forming data and image data, said image forming data consisting of a plurality of image forming data items each representing conditions of forming one page of image;
   processing the information, thereby to generate job files each consisting of image data items which represent pages of image to be formed under any identical condition and an image forming data item which represents said identical condition and other conditions;
   storing the job files generated; and
   forming pages of image on recording media in accordance with the job files, in units of pages which are represented by one job file.

10. A method according to claim 9 wherein said identical condition is either one condition or a plurality of different conditions.

11. An image forming apparatus comprising:
    means for receiving a plurality of page data, each of said page data including an image data and an attribute data corresponding to said image data;
    means for generating at least one image forming job file including said image data having the common attribute data; and
    means for forming images according to said image data of each of said at least one image forming job file generated by the generating means.

12. An image forming apparatus according to claim 11, wherein said generating means generates one image forming job file when the successive page data has the common attribute data.

13. An image forming apparatus comprising:
    means for receiving a plurality of page data successively, each of said page data including an image data and a plurality of attribute data corresponding to said image data;

means for generating at least one image forming job file including said image data of successive page data when at least one of the plurality of attribute data of successive page data is identical; and means for forming images according to said image data of each of said at least one image forming job file generated by the generating means.

14. A method of forming images, comprising the steps of:

receiving a plurality of page data, each of said page data including an image data and an attribute data corresponding to said image data;

generating at least one image forming job file including said image data having the common attribute data; and forming images according to said image data of each of said at least one image forming job file generated by the generating means.

* * * * *